United States Patent [19]

Day

[11] 4,065,894
[45] Jan. 3, 1978

[54] REPLACEABLE DOUBLE GLAZED WINDOW DEFOGGING APPLIANCE AND WINDOW STRUCTURE THEREFOR

[76] Inventor: Ralph K. Day, 307 W. Harrison Ave., Maumee, Ohio 43537

[21] Appl. No.: 639,055

[22] Filed: Dec. 9, 1975

Related U.S. Application Data

[63] Continuation-in-part of Ser. No. 361,989, May 21, 1973, Pat. No. 3,932,971.

[51] Int. Cl.² .............................................. E06B 7/12
[52] U.S. Cl. ..................................................... 52/171
[58] Field of Search ...................... 55/385 R; 206/204; 52/171, 172, 127; 137/223

[56] References Cited

U.S. PATENT DOCUMENTS

| 2,193,853 | 3/1940 | Axe | 52/399 |
| 2,202,694 | 5/1940 | Haux | 52/309 |
| 2,276,112 | 3/1942 | Stoneback | 52/172 |
| 2,354,341 | 7/1944 | Verhagen | 52/399 |

*Primary Examiner*—John E. Murtagh
*Attorney, Agent, or Firm*—David H. Wilson

[57] ABSTRACT

An appliance comprising a unitary, atmospheric pressure, equalization chamber and drying chamber in the form of a sealed, flexible walled container is provided with means communicating from its interior to the space between a double glazed window. A separable coupling between the container and the space permits replacement of the appliance when its drying capability is exhausted. Window frame contructions unobtrusively incorporate the appliance in a cavity which has a removable cover. Variations in atmospheric pressure are balanced within the space between the window lights by changes in the atmospheric pressure on the flexible walled container while such changes transfer gas between the space and the container to expose it to the desiccant. One separable coupling passing the gas is a hollow needle inserted through a resilient, self-sealing, passage which can be integral with a seal gasket between the lights.

6 Claims, 5 Drawing Figures

REPLACEABLE DOUBLE GLAZED WINDOW DEFOGGING APPLIANCE AND WINDOW STRUCTURE THEREFOR

CROSS-REFERENCE TO RELATED APPLICATION

This application is a continuation-in-part of U.S. patent application Ser. No. 361,989 May 21, 1973 for "Window Construction" by Ralph K. Day, now U.S. Pat. No. 3,932,971 which issued Jan. 20, 1976.

BACKGROUND OF INVENTION

The use of double panes of glass and even triple panes of glass in order to provide insulation against heat and noise is well known. Such windows comprise two or more parallel panes of glass, usually mounted in an elastomeric material such as rubber, for example. That is to say, a strip of rubber material is disposed between the panes of glass at their edges, the rubber on the outside of said edges and below said edges. Means for compressing the rubber so as to seal the glass panes therein and prevent air from leaking into or out of the space between the panes is also provided.

In principal, the idea is extremely simple, however in order to be effective as an insulating device, it is necessary that the dead air space between the panes of glass is effectively sealed. Not only is the insulating value of such windows dependent upon the maintenance of the tight seal, but in addition, visibility also depends upon it. If moisture condenses on the inner surface of the glass, or if a film of grease or dirt accumulates thereon, visibility will obviously be adversely affected if not altogether destroyed. Since it is often impractical to clean the surfaces, it is clear that an effective type seal is vital.

A number of attempts have been made from time to time to provide a satisfactory solution of the problem. These have in general involved the use of rubber sealing strips such as gaskets, with various means for compressing the gaskets against the panes. Experience, however, shows that such constructions do not consistently provide sufficiently uniform pressure to provide an effective air-tight seal when subjected to conventional manufacturing techniques, particularly in wooden sash constructions.

The use of a conventional rubber sealing strip in the normal way, that is, without special efforts to achieve uniform compression, substantially reduces the circulation between the ambient air and the space between the panes. One result is thus that the insulating effectiveness may reach a reasonably good level. Another is that the accumulation of dirt between the panes is retarded; however, when it accumulates, the situation is just as unsatisfactory as the case of an ordinary storm window. If humid air gets into the space between the panes, and the ambient temperature drops, condensation of moisture occurs between the panes and, since the circulation between the ambient air and the space between the panes is slow, the window may remain "fogged" for very substantial periods of time. Thus, in order to decrease the dirt problem, one finds that one has introduced condensation problems which are quite detrimental to good visibility.

Various forms of factory sealed windows when maintained sealed as by fused metal or glass offer high quality insulation. Where pressure elastomeric gasket seals or flexible adhesive seals are provided, the dirt and condensation problem is minimized but still exists. The difficulties with these windows are the extremely high cost, high insurance cost, and expense and difficulty of repair and replacement. The fact that factory fabricated insulating windows can be purchased only in certain specific standard sizes also places limitations in design, especially when curved windows are involved.

The fact that such expensive solutions have nevertheless found very substantial commercial success clearly indicates that the problem itself, that is obtaining good insulating quality without visibility impairment, is a pressing problem and a problem of great commercial importance, and one for which no obvious answer exists.

Thus, there remains a problem of providing a seal as good as presently possible only with factory fabricated insulating windows, which is at the same time inexpensive, readily adapted to any size or shape of window including curved windows, and which can be installed and repaired at the job site instead of requiring factory fabrication.

Of course, air-tight seals are well known in technology, but the problem in connection with the insulating windows is to obtain a seal which is not only effective, but also extremely simple in design and installation and extremely low in cost. Complicated construction may make excellent air-tight seals for scientific and industrial apparatus, but have no place in the construction of buildings, or in vehicles such as automobiles, buses, trains, and airplanes, for simplicity is required.

The difficulties which must be overcome in the solution of this problem include the following:

1. Considerable force must be necessary to make a tight seal, but glass panes must not be broken nor stressed so that the glass panes might break upon a temperature or atmospheric pressure change of additional stress.

2. It is not sufficient to provide an excessively large force at some points and inadequate force elsewhere. "Averages" are not what counts here, but rather a uniform seal around the peripheral inner edges of the adjacent surfaces of the glass panes.

3. Expansions and contractions caused by temperature variations with seasonal changes and by pressure variations with changes in elevation, for example during shipment, must be accounted for without causing breakage on one hand and/or air leakage on the other.

Heretofore, pressure variations between the gas within the space between the lights of a double glazed window and atmosphere as caused by temperature changes or changes in atmospheric pressure have been compensated to reduce the pressure differential across the seals between the lights by providing an auxiliary chamber containing a fixed amount of gas which is at the pressure within the space and is varied in volume to match or approach atmospheric pressure. Larkin U.S. Pat. No. 1,852,661 of Apr. 5, 1932 for "Show Case Refrigerator" discloses sylphons exterior of the double glazed windows of the case and in gas flow communication with the space between the lights so that they expand and contract to compensate for differences in pressure between the interior and exterior of the space. Miller et al., U.S. Pat. No. 2,015,808 of Oct. 1, 1935 for "Double Window Construction" discloses a frame including a cavity containing a tube of thin metal or rubber which may be collapsed and expanded when varying air pressures are applied to the unit. The prior art has also attempted to eliminate the problem of fogging between lights of a hermetically sealed window or transparent panel which is double glazed by introducing dry gas in the space between the lights and/or by including a desiccant in a container in gas communication with that space. Lenhart U.S. Pat. No. 1,913,205 of June 6, 1933 for "Antifogging Device" shows a tray of desiccant screened from but in gas flow communication with the space between lights of a double glazed window. Alternatively a number of patents disclose valves providing admission of gas to the space between lights of double glazed windows and suggest the temporary connection of sources of dry gas for drying and flushing such space. Typical of these U.S. Pat. Nos. are:

1,495,948 — Carney — May 27, 1924
1,851,515 — Hunt et al. — Mar. 29, 1932
2,009,142 — Marsh — July 23, 1935
2,117,581 — Stoneback — May 17, 1938
2,756,467 — Etling — July 31, 1956
2,880,475 — Mills — Apr. 7, 1959

Leaks in the units of the prior art having gas drying arrangements have resulted in the admission of sufficient moisture to exhaust the drying capabilities of the desiccant in those units containing a desiccant and the ultimate fogging in the interior of the window. These leaks have been attributed to the pressure differentials between the interior and exterior. In Summers U.S. Pat. No. 2,083,622 of June 15, 1937 the concept of a pressure equalization mechanism combined with a drying medium is disclosed for a double walled panel which in some embodiments is of transparent material. The combination of Summers is cumbersome and does not lend itself to application to conventional windows. Further, if some leakage of moisture into the system does occur the desiccant can be exhausted with a resultant failure of the system.

A replaceable desiccant supply has been proposed for double glazed windows. In Fox U.S. Pat. No. 2,088,738 of Aug. 3, 1937 for "Double Glazed Window" a detachable casing containing desiccant is screw coupled into a cavity in the face of the window frame which is in gas flow communication with the space between the window lights so that it can be replaced when the desiccant is spent. However, this casing protrudes from the window frame and offers an unsightly obstruction. Further, it is a dead end to the gas conduit from the window enclosure with no circulating means and therefore offers only limited access to the gas within the enclosure.

McCurdy et al. U.S. Pat. No. 3,685,239 of Aug. 22, 1972 for "Hermetically Sealed Double Glazed Window Unit and Method for Sealing Same" discloses a rechargeable desiccant chamber in the wall of a window frame wherein a lower port can be opened to withdraw spent granular desiccant and an upper port through which a new charge of desiccant can be introduced. Screw plug seals are disclosed for each port.

SUMMARY OF THE INVENTION

The above problems and disadvantages have been overcome by a window structure having two or more superposed spaced lights utilizing a sealing member to enclose the space between the lights in combination with a disposable detachable appliance which contains a drying agent and has flexible walls. The appliance fits within a suitable cavity in the window structure. It has a duct extending from its interior through the sealing member to provide gas flow communication between the space between the lights and the appliance interior. The sealed system tends to compensate for pressure differentials between the space between the lights and the ambient atmosphere by the expansion and contraction of the appliance and by this atmospheric pumping circulates gas from between the lights, along with moisture it may contain, over the drying agent. When the drying capacity of the appliance is spent, it can be replaced and a new appliance can be installed in its stead to continue the drying and pressure compensating function without removing the sash from the window frame.

In a preferred embodiment the appliance is in the form of a flexible, elastomeric walled chamber which can expand and contract under the influence of changes in atmospheric pressure thereby receiving and issuing gas by atmospheric pumping. This transfers gas from space between the lights of the double glazed unit through a thin hollow tube in gas flow communication with the chamber-interior and the chamber containing a drying agent. The tube can be inserted through a self-sealing puncture in a resilient gasket between and sealing the space between the lights. When withdrawn, the puncture tends to close thereby preventing any substantial influx of gas, dirt or moisture. A sash frame, preferably of wood, has a cavity for the flexible walled chamber which is vented to ambient atmosphere and is provided with an unobtrusive coverplate whereby a spent chamber and its coupling tube can be extracted and a chamber containing fresh desiccant substituted by inserting its tube through the puncture in the gasket.

An object of this invention is to improve multiglazed windows.

A second object is to overcome fogging due to entrapped moisture from multiglazed windows.

A third object is to enable an unskilled person to replenish a desiccant charge for multiglazed windows.

A fourth object is to enhance the circulation of the atmosphere which is between lights of a multiglazed window into a chamber containing a desiccant.

Another object is to improve the appearance and reduce the complexity, original cost and maintenance cost of multiglazed windows having means for removing moisture from between the lights of the window and for compensating pressure differentials between the space between lights and ambient atmosphere.

BRIEF DESCRIPTION OF THE DRAWINGS

The above, as well as other objects and advantages of the invention, will become readily apparent to one skilled in the art from reading the following detailed description of an embodiment of the invention when considered in the light of the accompanying drawings, in which.

DETAILED DESCRIPTION OF THE PREFERRED EMBODIMENT

Figure 1:
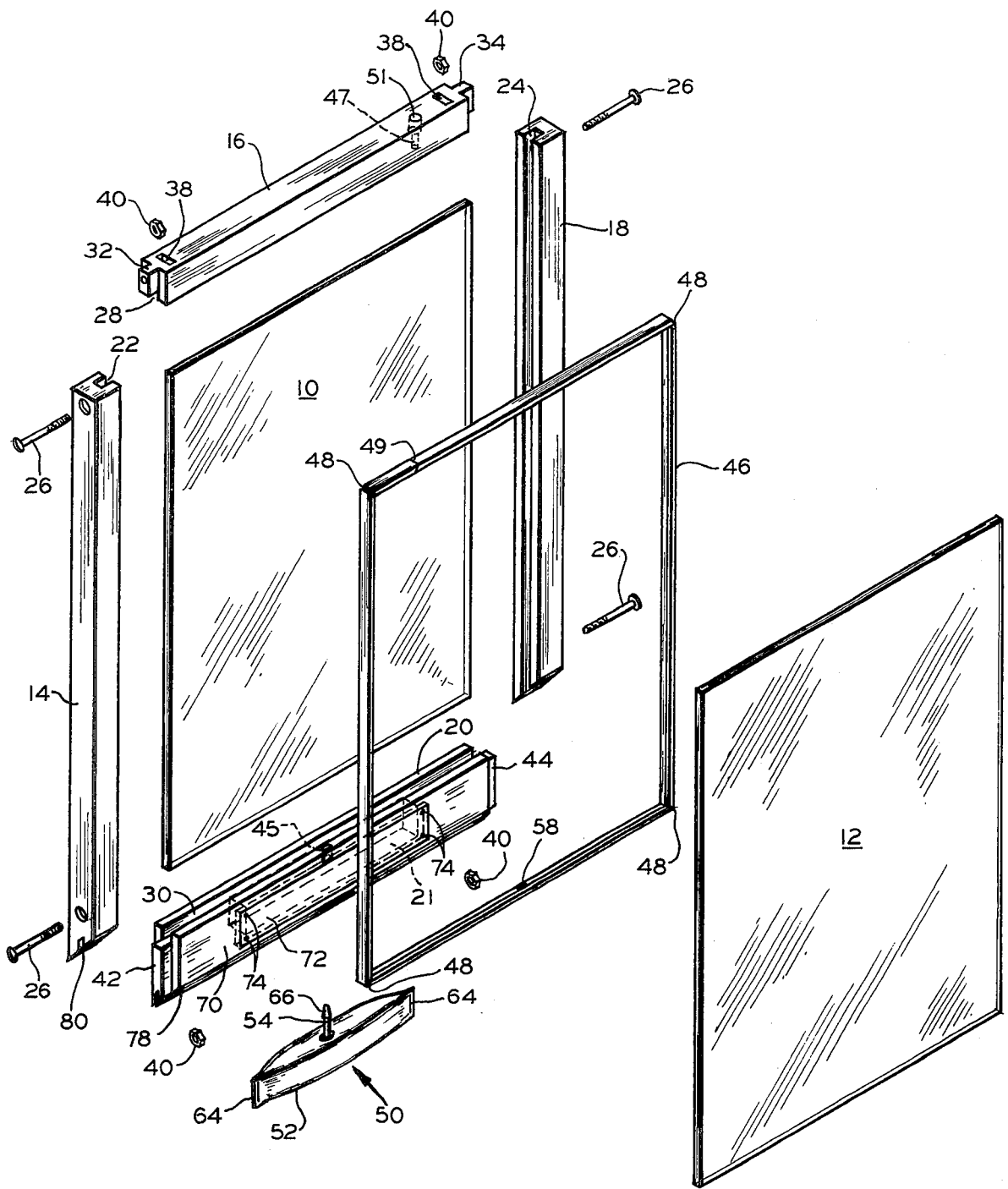
FIG. 1 is an exploded perspective view of a double glazed window construction embodying features of the present invention.

Referring to FIG. 1, there is shown a window construction preparatory to the final assembly. The window construction includes a pair of panes of glass 10 and 12 which are of substantially identical dimensions. Many states have passed legislation requiring that glass used in openings which have been defined as hazardous areas such as patios, doors and windows must be safety or tempered glass. Accordingly, the type of transparent sheet material utilized for the lights or panes 10 and 12 may depend on local statutes and the particular type of material does not affect the present invention.

The frame of the window of FIG. 1 includes frame elements 14, 16, 18 and 20 preferrably formed of wood. Wood is chosen as the preferred material for use as the frame because of its low thermal conductivity. The frame elements 14 and 18, are substantially identical with one another. The bottom frame element 20 is deeper than the top element 16 and contains a cavity 21 open at its underside. The vertically disposed frame elements 14 and 18 are provided with longitudinally extending grooves 22 and 24, respectively. Threaded fastener receiving holes are suitably formed in the frame elements 14 and 18 at opposite ends thereof to receive threaded fasteners such as bolts 26.

The horizontally disposed frame elements 16 and 20 are provided with longitudinally extending grooves 28 and 30, respectively. Extending outwardly from opposite ends of the frame element 16 are tongues 32 and 34 which, in the assembled form of the window construction, fit within the grooves 22 and 24 of the frame elements 14 and 16, respectively. Inwardly of each of the tongues 32 and 34, slots 38 are formed to receive nuts 40 which are adapted to align with holes in the tongues 32 and 34 positioned to receive the bolts 26 when the frame is assembled. The frame element 20 also has outwardly extending tongues 42 and 44 which fit within the grooves 22 and 24 of the frame elements 14 and 18, and have holes formed therein which are adapted to receive the bolt 26 when the frame is assembled. Slots (not illustrated) are formed in the frame element 20 to receive the nuts 40 in the same manner as the slots 38 of the frame element 16. It will be understood that the slots formed in the frame element 16 and 20 to receive the nuts 40 are fashioned such that when the nuts are disposed therewithin, the nuts are prevented from rotating and are snugly seated.

Figure 2:
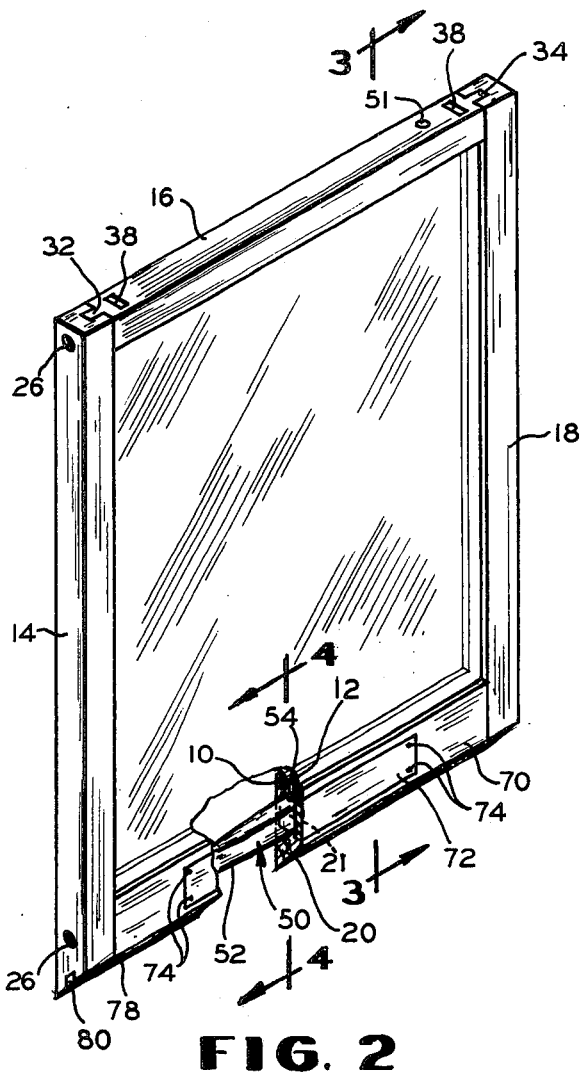
FIG. 2 is a partially broken away perspective view of an assembled double glazed window construction embodying additional features of the invention not illustrated in the embodiment of FIG. 1.
Figure 3:
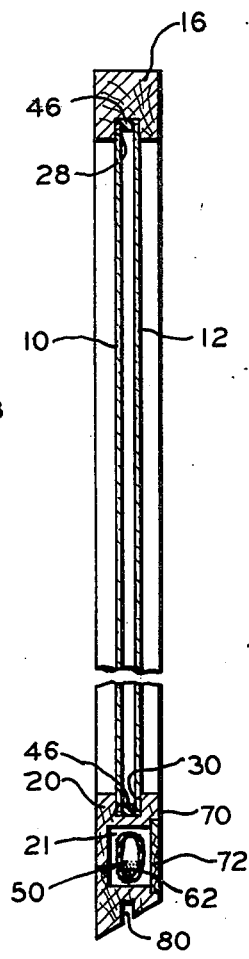
FIG. 3 is a sectional view of the structure illustrated in FIG. 2 taken along line 3—3 thereof.

An elongate gasket strip 46 of an elastomeric material being contoured to form an airtight contact around the marginal edge portions of the facing surfaces of the glass panes 10 and 12 is placed around the panes 10 and 12. It has been found desirable to blunt the sharp edges of the cut glass panes 10 and 12 by use of an abrasive material such as fine grained tungsten carbide, for example. This will enable the handling of the glass panes without accidental cutting of the elastomeric strip 46 or the assembler's hands. After assembly of the window to the form shown in FIG. 2, it is desirable to flush a dry gas between the facing surfaces of the glass panes 10 and 12 to absorb moisture in the air therebetween to thereby militate against a fogging condition which might be caused by condensation of the moisture in the entrapped air. Such gas can be admitted through one of the passage 45 extending from cavity 21 through frame bottom 20 and the passage 47 through frame top 16 and withdrawn through the other of the passages as by means of hollow needles (not shown) which puncture strip 46 in registry with the respective passages 45 and 47.

In order to facilitate the formation of a substantially right angle turn of the strip 46 at the corners of the glass panes 10 and 12, a transverse slit 48 is formed in the outer surface of the strip. The opposite ends of the strip 46, which are joined to complete the encircling seal, are typically beveled and glued together to form a scarf joint 49.

Finally, the frame elements 14, 16, 18 and 20 are placed over the elastomeric strip 46 and the marginal edges of the glass panes 10 and 12 in such a fashion that the strip 46 and the marginal edges of the panes are received snugly within the grooves 22, 24 28 and 30. During the assemblage of the frame elements over the marginal edges of the glass panes 10 and 12 and the strip 46, it will be understood that the width dimension of the grooves 22, 24, 28 and 30 are such that the strip 46 must be compressed to assure that an air-tight seal is formed between the opposing side walls of the strip and the adjacent inner facing surfaces of the marginal edges of the glass panes 10 and 12. Then the bolts 26 are inserted in the holes formed in the frame elements 14 and 18 are threadedly engaged with nuts 49 in slots 38, and are tightened to draw the tongues 32 and 34, and 42 and 44 of the frame elements 16 and 20 snugly within the grooves formed in the associated frame elements 14 and 18. After the bolts 26 are tightly secured and fastened within the nuts 40, the window construction is completed.

It will be observed that in the event that it is ever necessary to disassemble the window to clean the interior surfaces of the glass panes 10 and 12, it is necessary only to loosen the four bolts 26 until they are disengaged from their respective nut 40 and pull the frame elements 14, 16, 18 and 20 apart.

In order to minimize leakage due to the changes in atmospheric pressure and temperature to which the assembled window unit is subjected, it is provided with a unitary appliance 50 which tends to eliminate pressure differentials between the gas filling the space between lights 10 and 12 and ambient atmosphere by an equalizing flow of gas between the interior of the appliance 50 and the space as atmospheric pressure changes or as the temperature therein changes. This appliance 50 comprises a flexible walled, sealed chamber of gas impervious material such as a bladder 52 of an elastomer such as butyl rubber or the like having its ends 64 closed and sealed against the passage of air and moisture. In the usual applications to a sash 1½ inches thick a bladder 1¼ inches in diameter can be fitted in a 1 inch wide cavity 21, 2 inches deep. A suitable combination for a window 30 inches square utilizes a bladder 52 which is 14 inches long and is in a slack condition at normal atmospheric pressure. A conduit 54 which can be a copper tube of from one-eighth inch to three sixteenth inch outer diameter having an axial passage for gas is arranged with a rigid tab 56, which may be sheet copper, soldered thereto is mounted internal of bladder 52 to provide a grip element for insertion of the rigid tube 54 through passage 45 and through aperture 58 in gasket strip 46. Tube 54 is passed through an undersized aperture 60 in bladder 52 so that the resilience of the bladder wall around the perimeter of aperture 60 seals the wall to the tube against the passage of air or moisture. Similarly, the aperture 58 in gasket strip 46 is of smaller diameter than the o.d. of tube 54 to effect an air and moisture seal between those elements.

In practice the tube 54 and tab 56 are assembled and then mounted in the bladder 52 with tube 54 passed through aperture 60. The desiccant 62 in granular form such as W. R. Grace No. 801 desiccant, is poured into the bladder 52 to fill about half the bladder volume, about 50 grams of desiccant in the example. Advantageously, passage of desiccant through tube 54 is blocked by a gas permeable plug 63 such as a cotton body. The bladder is then sealed as by closing the end through which the tube-tab subassembly and desiccant were introduced and the end 65 of tube 54 is sealed as by placing an elastomeric cap 66 over the end 65. End 65 is reduced in its outer diameter to facilitate application of cap 66 and insertion of tube 54 through aperture 58 in gasket strip 46. A lubricant for metal to rubber joints can be applied to tube 54 to further facilitate its passage through apertures 58 and 60 and to enhance the seals. Typically, a silicone lubricant can be employed for this purpose.

The assembled window is made up with a pressure equalization and dryer appliance 50 mounted in cavity 21 with the end of tube 54 inserted through aperture 58 and into the space between lights 10 and 12. When thus assembled following flushing of the space with dry gas, the appliance tends to eliminate pressure differentials between the space and ambient atmosphere by the expansion and contraction of the bladder 52. It thereby militates against the transfer of ambient atmosphere into the space between the lights. However, in the event there is any leakage, the transfer of the gas in the space intermediate the lights 10 and 12 between that space and the interior of bladder 52 with changes in atmospheric pressure and temperature circulates the gas over the desiccant 62 to dry it and prevent fogging.

In the event sufficient moisture is admitted to the space between lights 10 and 12 to saturate the desiccant 62 so that the window becomes fogged, replacement of the drying and pressure compensating appliance 50 can be readily accomplished by withdrawing tube 54 of the spent appliance 50 from aperture 46 and removing the entire subassembly from cavity 21. A new appliance 50 with dry desiccant can be mounted in cavity 21 by grasping tab 56 through the flexible walls of bladder 52 and employing it as a handle to insert the tapered tip of new tube 54 into aperture 46.

Figure 4:
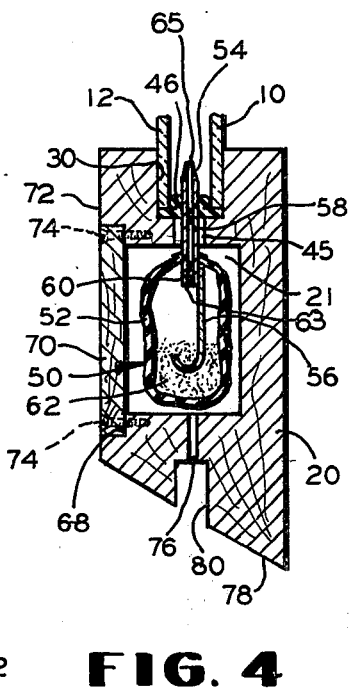
FIG. 4 is an enlarged fragmentary view in section illustrating the relative disposition of the frame, panes of glass, the pressure compensating and dehydrating appliance, and the sealing strip.
Figure 5:
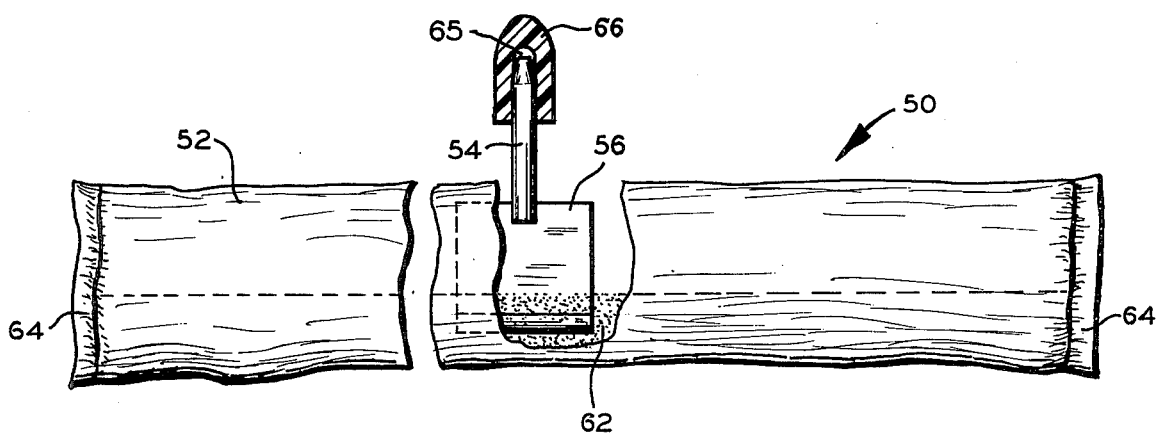
FIG. 5 is an enlarged, partially broken away elevational view of the pressure compensating and dehydrating appliance.

As is best seen in FIGS. 4 and 5 the appliance interior, the interior of the flacid elastomeric envelope forming bladder 52, is isolated from ambient atmospheric moisture both while stored for future use, as when held for sale to a consumer, and when applied to the window so that the desiccant 62 is exposed only to the limited atmosphere enclosed in the bladder 52 and, when applied to the window, to the atmosphere in the space between lights 10 and 12. Gasket strip 46 embraces tube 54 by the resilience of the walls surrounding aperture 58 in FIG. 4. Seal cap 66 sealingly embraces the end of tube 54, as shown in FIG. 5, prior to installation of appliance 50 in a window unit.

The mounting of appliance 50 in bottom frame member 20 is generally shown in the sectional view of FIG. 4. Cavity 21 is formed in member 20 with a land 68 at its perimeter on the inner side of the sash. A cover panel 70, which can be wood to match the remainder of the frame is mounted flush with the exposed inner face 72 of member 20 and against land 68 to present an unbroken appearance at outer face 72. Wood screws 74 are shown securing panel 70.

Ambient atmospheric pressure is provided access to cavity 21 and thus the exterior of bladder 52 by vent holes 76 unobtrusively located in the bottom 78 of the element 20 and communicating between the exterior and cavity 21. In the illustration, the vent holes 76 extend into a weatherstripping slot 80 in bottom 78.

A fogged window is dried according to this invention by removal of panel 70, grasping tab 56 through the squeezing of the opposed walls of bladder 52 overlying that tab 56, as between the thumb and forefinger and withdrawing tube 54 from aperture 58. The new appliance 50 is then stripped of its cap 66 and its tube 54 inserted by grasping its tab 56 and employing it as a handle for inserting tube 54 through passage 47 into aperture 58. The cover panel 70 is then remounted.

It will be appreciated that the appliance 50 is contemplated as an expendable item of commerce which can be sold separately as a replacement element for the dehydration and pressure compensation of the window unit. Further, since the window unit offers a dry assembly, that is, it requires no mastic or putty, on site disassembly and assembly is facilitated. For example, if one or both lights might be broken, they can be replaced on site by disassembly of the sash, replacement of the broken light of lights and if necessary, the gasket strip 46, reassembly of the sash upon the paired and gasketed lights and the installation of a dehydrating and pressure compensation appliance 50. Where high moisture content of the reassembled unit saturates the desiccant 62 of the initially installed appliance 50, a second appliance containing fresh desiccant can be substituted after the reassembled window unit has been partially dried by the first.

The invention has been illustrated with a single appliance. Several appliances might be provided on larger windows or where conditions tend to cause large amounts of moisture to be admitted between the lights. The material of the window units and their assembly elements and techniques can be varied. Accordingly, it is to be appreciated that the above disclosure is illustrative of the invention and is not to be read in a limiting sense.

What I claim is:

1. In combination a pair of substantially parallel spaced apart panes of transparent sheet material; resilient gasket means disposed between the marginal edges of the facing surfaces of said panes; said gasket means having compressible faces engaging the adjacent faces to said spaced apart panes and defining an enclosed volume between the facing surfaces of said panes; a frame circumscribing the periphery of said panes said frame including elements having grooves for receiving the marginal edge of said panes to urge said panes toward one another to compress said gasket an amount sufficient to produce an air-tight sealing contact between the marginal edges of the facing surfaces of said panes and said gasket means; at least one of said frame elements having a receptacle, and a passage between said receptacle and the groove of said element; said gasket means having an aperture in registry with said passage and extending to said enclosed volume; a sealed detachable container having flexible walls fitted within said receptacle and carrying a quantity of dehydrating material a rigid tube extending outwardly from said flexible walls of said container and sealingly secured to said container walls; and a means for supporting said tube with respect to said container to facilitate its manipulation through said gasket aperture; said tube extending from said container through said passage and said gasket aperture to provide gas flow communication between the interior of said container and said enclosed volume; and passage means providing communication between ambient atmosphere and said receptacle within said frame for pumping gas between said container and said enclosed volume.

2. The combination according to claim 1 wherein said gasket is resilient and said means for supporting said tube comprises a rigid grip element of extended area rigidly coupled to said tube to facilitate insertion of said tube through said gasket aperture; and a sealed coupling between the resilient walls of said gasket aperture and said tube.

3. The combination according to claim 2 wherein said grip element is within said flexible container.

4. An appliance adapted to be coupled to a double glazed window having a seal gasket engaging the marginal edges of adjacent faces of spaced panes of transparent sheet material comprising an air-tight bladder of flexible sheet material; a rigid tube extending outwardly from said flexible walls of said bladder and sealingly secured to said bladder walls; and a means for supporting said tube with respect to said bladder to facilitate its manipulation through said seal gasket; said tube having an axial passage extending from said bladder and being adapted to be inserted through said seal gasket to provide gas flow communication between the volume enclosed by said spaced apart panes and the interior of said bladder; a dehydrating agent within said bladder; a means to seal said tube passage from ambient atmosphere.

5. An appliance according to claim 4 wherein said means for supporting said tube comprises a rigid tab fixed to the tube within said bladder to facilitate manipulation of said tube through said seal gasket.

6. An appliance according to claim 4 wherein said tube extends into said bladder and said means for supporting comprises a rigid grip element of extended area rigidly coupled to said tube to facilitate manipulation of said tube through said seal gasket.

* * * * *